(No Model.)

C. E. KELLOGG.
CUSPIDOR HOLDER.

No. 518,107. Patented Apr. 10, 1894.

WITNESSES:
Frank S. Ober
H. M. Skinner

INVENTOR
Charles E. Kellogg.
BY
R. C. Mitchell,
ATTORNEY

THE NATIONAL LITHOGRAPHING COMPANY,
WASHINGTON, D. C.

UNITED STATES PATENT OFFICE.

CHARLES E. KELLOGG, OF WEST HARTFORD, ASSIGNOR TO THE HARTFORD SANITARY MANUFACTURING COMPANY, OF HARTFORD, CONNECTICUT.

CUSPIDOR-HOLDER.

SPECIFICATION forming part of Letters Patent No. 518,107, dated April 10, 1894.

Application filed November 8, 1893. Serial No. 490,341. (No model.)

*To all whom it may concern:*

Be it known that I, CHARLES E. KELLOGG, of West Hartford, county of Hartford, and State of Connecticut, have invented a certain new and useful Improvement in Cuspidor-Holders, of which the following is a full, clear, and exact specification.

My invention relates to certain new and useful improvements in holders for cuspidors.

The objects of my invention are to construct a holder for cuspidors, made from any suitable substance, as paper, which holder will be simple and inexpensive, yet which will perform its functions in a satisfactory manner.

My invention is illustrated by the accompanying drawings, in which—

Figure 1:
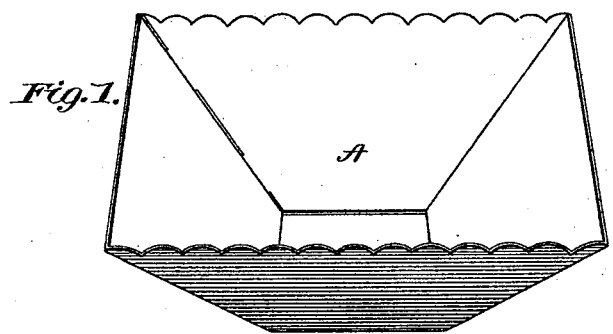
Figure 2:
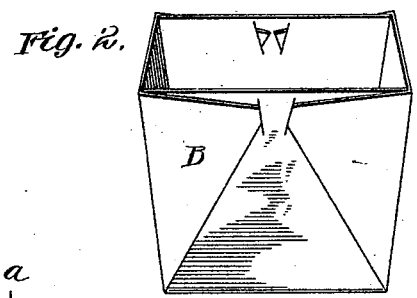
Figures 3, 4, 5:
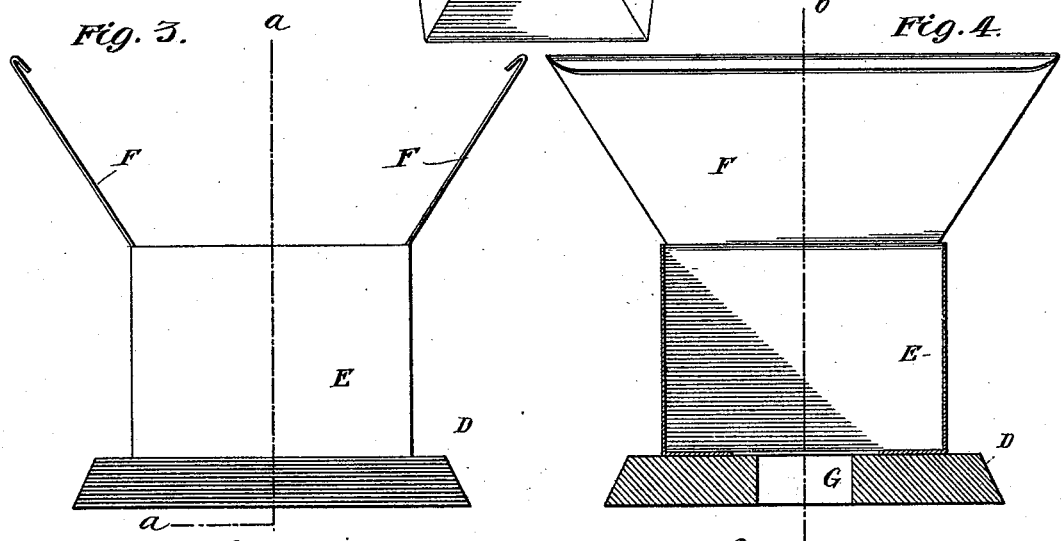

Figure 1 is a perspective view of a shield. Fig. 2 is a perspective view of a cup. Fig. 3 is a side elevation of my invention. Fig. 4 is a cross section of Fig. 3 on the line $a—a$, and Fig. 5 is a cross-section on the line $b—b$ Fig. 4, showing the cup and shield in place within the holder.

I wish it to be understood that I do not claim the device shown either in Figs. 1 or 2 as novel; these figures are added merely to assist in explanation of my invention.

Similar letters refer to similar parts in all views.

A is that portion of a common form of cuspidor called the shield, formed of any suitable substance. The sides of this shield project outwardly over the sides of the receptacle in the ordinary manner at a low pitch, as illustrated in Fig. 5.

B is a cup-shaped receptacle formed of preferably the same substance of which the shield is formed and adapted to hold the liquid.

D is the base of the holder. Projecting outwardly from the base D and secured thereto is an outside casing E,—the body of which may be suitably ornamented with fancy figures and the like, if desired,—made of any desired material, preferably some sheet-metal. Projecting upward and flanging outward from the two opposite sides of the casing E are the wings F F. The upper edges of these wings F F are turned over, as shown in Figs. 3, 4 and 5, for the purpose hereinafter described. These wings in combination with the casing E and the base D constitute my invention.

In operation, the cup B is placed within the casing E, as shown in Fig. 5, the shield A is placed as shown in Fig. 5, and the upper edges of the shield A, which is adjacent to the hooked upper edge of the wings F F, are slipped under the hooked edges, as shown in Fig. 5, thereby securely holding the three parts A, B and E together, so that they cannot be separated until the upper edges of the shield A are withdrawn from under the hooked upper edges of the holder. If desired, a hole G may be made in the base D below the bottom of the cup B for the purpose of facilitating the removal of the said cup from the casing E, should the upper edge of the cup B be dropped down into the receptacle so far as to be inaccessible. This, however, is not imperative.

The wings F F preferably taper outwardly, as shown in Fig. 4, thus making the upper edge of said wings longer than the lower edge, so that the said wings will coincide with the side of the shield A. If preferred, the base D may be formed as a part of the casing E.

Having thus described my invention, what I claim, and desire to secure by Letters Patent, is—

1. A cuspidor holder consisting of a base, supporting thereon a casing adapted to carry a liquid receiving receptacle, with flexible wings extending from the upper edge of the said casing and carrying the shield A, the extreme upper edge of the said wings being turned inward to form hooks which operate to securely hold in place the said shield, substantially as and for the purpose specified.

2. A cuspidor holder consisting of a rectangular outside casing carrying a cup-receptacle, said casing having outward projecting flexible wings extending from the upper edge of the casing and carrying the shield A, the said wings being hooked inward along their upper edge for the purpose of admitting and retaining the upper edge of the said shield, the lower edges of the shield projecting slightly into the liquid receptacle, substantially as described.

3. A cuspidor holder consisting of the perforated base, supporting a casing adapted to surround the sides of the cup-receptacle, the upper edge of the said casing having attached thereto, upwardly and outwardly inclined flexible wings the side edges of which, taper outwardly so that the wings are broadest at their upper end, the extreme upper edge of
5 said wings being turned inwardly to form hooks adapted to retain the upper edge of the shield, the lower edge of the shield A projecting slightly into the cup-receptacle, substantially as and for the purpose specified.

CHARLES E. KELLOGG.

Witnesses:
W. C. PRESCOTT,
W. H. SCRIVENER.